US012686364B2

(12) United States Patent (10) Patent No.: US 12,686,364 B2
Sharpe et al. (45) Date of Patent: Jul. 21, 2026

(54) SENSOR-CLEANING ASSEMBLY

(71) Applicant: Ford Global Technologies, LLC,
Dearborn, MI (US)

(72) Inventors: Nicholas Sharpe, Grand Rapids, MI
(US); Michael Robertson, Jr., Garden
City, MI (US); Segundo Baldovino,
Novi, MI (US); Venkatesh Krishnan,
Canton, MI (US)

(73) Assignee: Ford Global Technologies, LLC,
Dearborn, MI (US)

( * ) Notice: Subject to any disclaimer, the term of this
patent is extended or adjusted under 35
U.S.C. 154(b) by 333 days.

(21) Appl. No.: 18/468,819

(22) Filed: Sep. 18, 2023

(65) Prior Publication Data

US 2025/0091551 A1       Mar. 20, 2025

(51) Int. Cl.
B60S 1/56 (2006.01)
B08B 5/02 (2006.01)
(52) U.S. Cl.
CPC .   B60S 1/56 (2013.01); B08B 5/02 (2013.01)
(58) Field of Classification Search
CPC ..... B60S 1/52; B60S 1/54; B60S 1/56; G02B
27/0006; B08B 5/02

USPC ....................................................... 15/300.1
See application file for complete search history.

(56) References Cited

U.S. PATENT DOCUMENTS 11,485,326 B2    11/2022  Matsushita et al.
2020/0114881 A1*   4/2020  Yamauchi ........... F04B 11/0033
2020/0331438 A1*  10/2020  Matsushita ............. F04B 35/04

FOREIGN PATENT DOCUMENTS

JP         7069844 B2    5/2022
WO      2021202837 A1   10/2021
WO      2022017772 A1    1/2022

* cited by examiner

*Primary Examiner* — Katina N. Henson
(74) *Attorney, Agent, or Firm* — Frank A. MacKenzie;
Brooks Kushman P.C.

(57)        ABSTRACT

A sensor-cleaning assembly includes a stationary faceplate
having multiple openings. The assembly additionally
includes a cylinder defining an axis and abutting the face-
plate at a first end of the cylinder. The cylinder can be
rotatable about the axis relative to the faceplate in which the
cylinder includes a passage from an inlet centered on the
axis to an outlet that is alignable with a first opening of the
multiple openings of the faceplate responsive to rotation of
the cylinder.

19 Claims, 3 Drawing Sheets

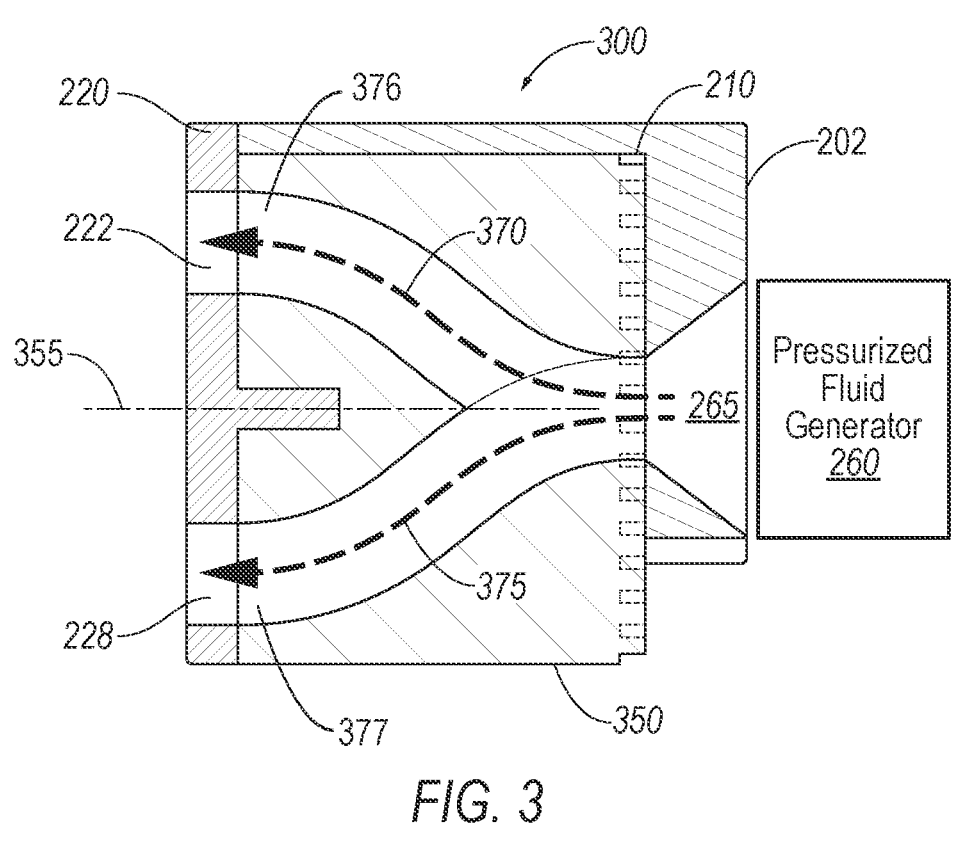

*FIG. 3*

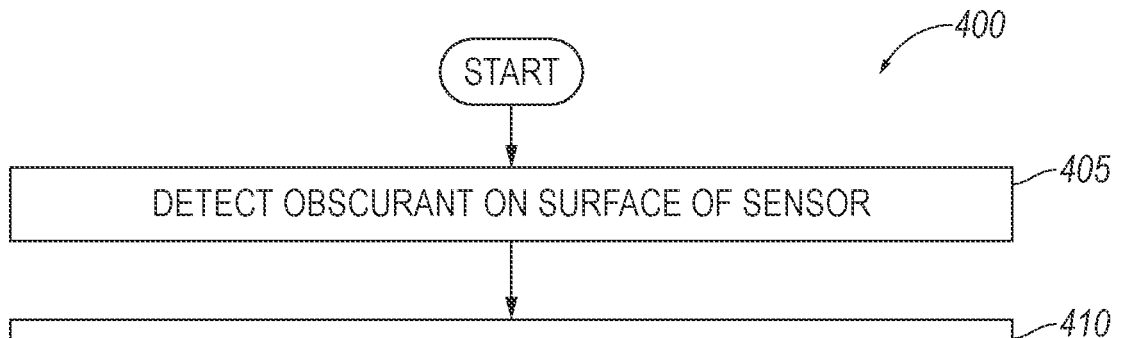

START

DETECT OBSCURANT ON SURFACE OF SENSOR — 405

ROTATE A CYLINDER ABOUT AN AXIS DEFINED BY THE CYLINDER TO FORM A PASSAGE BETWEEN AN INLET CENTERED ON THE AXIS AND AN OPENING OF A STATIONARY FACEPLATE HAVING MULTIPLE OPENINGS AND ABUTTED TO THE CYLINDER AT A FIRST END OF THE CYLINDER. THE OPENING BEING FLUIDLY COUPLED TO THE SENSOR, THE PASSAGE FROM THE INLET TO AN OUTLET BEING ALIGNABLE WITH A FIRST OPENING OF THE MULTIPLE OPENINGS OF THE FACEPLATE RESPONSIVE TO ROTATION OF THE CYLINDER — 410

*FIG. 4*

SENSOR-CLEANING ASSEMBLY

BACKGROUND

Autonomous and semi-autonomous vehicles typically include a variety of sensors. Some sensors detect the position or orientation of the vehicle, such as, for example, sensors of a satellite positioning system (e.g., GPS sensors); accelerometers (e.g., piezo-electric, microelectromechanical systems, etc.); gyroscopes (e.g., rate sensors, ring laser gyroscopes, fiber-optic gyroscopes, inertial measurement units, magnetometers, etc.). Other sensors detect objects external to a vehicle, e.g., radar sensors, scanning laser range finders, light detection and ranging (lidar) devices, and imaging sensors such as cameras.

BRIEF DESCRIPTION OF THE DRAWINGS

FIG. 3 is a cross-sectional side view of second example cylinder-shaped revolver of a sensor-cleaning assembly.

FIG. 4 is a flowchart for a method of operating a sensor-cleaning assembly.

DETAILED DESCRIPTION

Figure 1:
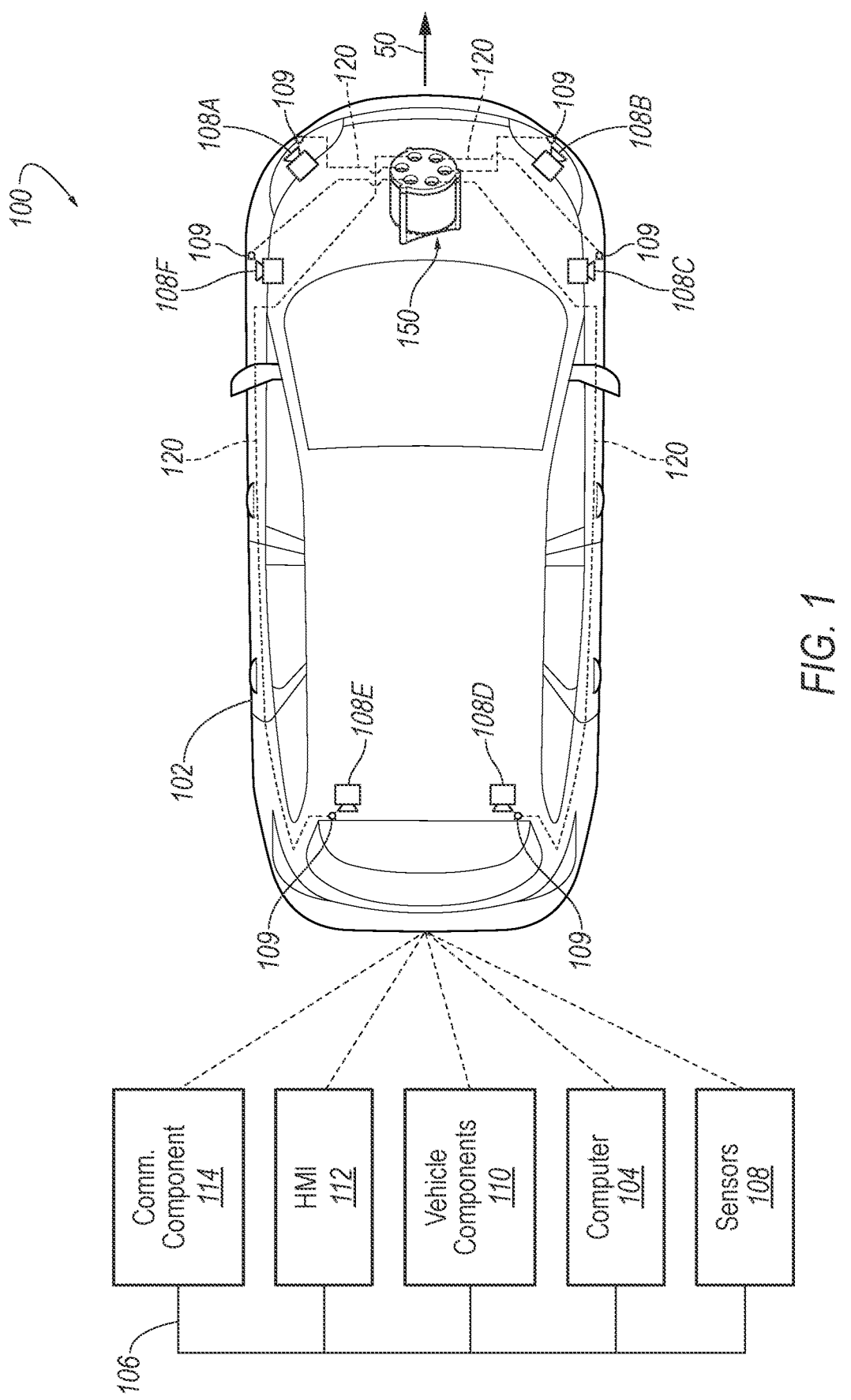
FIG. 1 is a block diagram of an example vehicle having a sensor-cleaning assembly.

Advantageously, in response to detection of an obscurant on a surface of, for example, a sensor (108A, 108B, 108C), a sensor controller (104A) can initiate a cleaning process to remove the obscurant from the surface of the sensor (108A, 108B, 108C, 108D, 108E, 108F). In an example, as described further in reference to the figures, the sensor controller (104A) can generate an output signal to align an outlet of a fluid passage (270) with an opening (222, 224, 226, 228, 230, 232) of a stationary multi-opening faceplate (220) that abuts a first side of a cylinder-shaped revolver (250). Alignment of the fluid passage (270) with the first opening (e.g., 222) may enable a fluid to flow from an inlet (265) of the cylinder-shaped revolver to the first opening (e.g., 222) of the stationary multi-opening faceplate (220). In an example, in response to formation of a passage (270) between the inlet (265) of the cylinder-shaped revolver (250) and the first opening (e.g., 222), the sensor controller (104A) can actuate a pressurized fluid generator (260), which may generate a pressurized fluid, such as an airflow, a flow of sensor-cleaning fluid, etc. Thus, in such an example, the pressurized fluid (e.g., airflow) can be coupled from pressurized fluid generator (260), through the passage (270) formed between the inlet (265) and the first opening (e.g., 222), and through a conduit (120) that fluidly couples the opening (e.g., 222) with a nozzle (109) or other type of outlet air duct aimed, for example, at the surface of the sensor (e.g., 108A, 108B, 108C, 108D, 108E, 108F). The plurality of openings on the stationary faceplate permit the same pressurized fluid generator and same inlet to selectively supply different nozzles, which are fluidly coupled to respective different openings on the faceplate.

In an example, a sensor-cleaning assembly can include a stationary faceplate having multiple openings and a cylinder that defines an axis and abuts the faceplate at a first end of the cylinder. The cylinder can be rotatable about the axis relative to the faceplate. The cylinder can include a passage from an inlet centered on the axis to an outlet that is alignable with a first opening of the multiple openings of the faceplate responsive to rotation of the cylinder.

The sensor-cleaning assembly can include an outlet that is alignable with a second opening of the multiple openings responsive to rotation of the cylinder.

The multiple openings of the sensor-cleaning assembly can be distributed at equal angular intervals with respect to the axis.

The sensor-cleaning assembly can additionally include a detent positioned to limit movement of the cylinder with respect to the faceplate in response to alignment of the first opening with the outlet.

The detent of the sensor-cleaning assembly can include a rounded surface coupled to a spring biased to extend the rounded surface from a cavity of the cylinder.

The sensor-cleaning assembly can include a detent having a rounded surface coupled to a spring to position the rounded surface within a recess of the faceplate responsive to alignment of the first opening with the passage.

The first opening of the sensor-cleaning assembly can be fluidly coupled to a nozzle aimed at a sensor cleanable by the sensor-cleaning assembly.

The inlet of the sensor-cleaning assembly can be fluidly coupled to a pressurized fluid generator.

The pressurized fluid generator of the sensor-cleaning assembly can be a pressurized airflow generator.

The multiple openings of the sensor-cleaning assembly can be spaced from the cylinder axis, and the multiple openings can be positioned radially between the cylinder axis and the periphery of the first end of the cylinder.

The passage of the sensor-cleaning assembly can include a fluid conduit that smoothly curves in a radial direction from the inlet to the outlet.

The cylinder of the sensor-cleaning assembly can include a gear plate at a second end of the cylinder. The gear plate can be arranged to rotate the cylinder responsive to actuation of a selector motor.

The selector motor of the sensor-cleaning assembly can be arranged to selectably rotate the cylinder between clockwise and counterclockwise directions.

The cylinder of the sensor-cleaning assembly can include a second passage from the inlet to a second outlet that is alignable with a second opening of the multiple openings responsive to rotation of the cylinder.

The second opening of the sensor-cleaning assembly can be positioned at a location that is across from the first opening with respect to the cylinder axis.

The second outlet of the sensor-cleaning assembly can be alignable with the second opening simultaneous with the outlet being aligned with the first opening.

The sensor-cleaning assembly can additionally include a controller to detect an obscurant at a surface of a sensor cleanable by the sensor-cleaning assembly. In response to detection of the obscurant, the controller can position the cylinder to align the outlet with the first opening, wherein the outlet is fluidly coupled to an outlet air duct aimed at the sensor.

The controller can additionally be to sense an increase in electrical current conducted to a selector motor coupled to the cylinder in response to a spring-biased rounded surface of the cylinder contacting a recess in the faceplate.

A method of operating a sensor-cleaning assembly can include detecting an obscurant on a surface of the sensor. The method can additionally include rotating a cylinder about an axis defined by the cylinder to form a passage between an inlet centered on the axis and an opening of a stationary faceplate having multiple openings and abutted to the cylinder at a first end of the cylinder. The opening can be fluidly coupled to the sensor, in which an outlet of the passage is alignable with a first opening of the multiple openings of the faceplate responsive to rotation of the cylinder.

Rotating the cylinder can include actuating a motor coupled to a gear that abuts the cylinder at a second cylinder end that is opposite the first end.

With reference to the Figures, wherein like numerals indicate like parts throughout the several views, FIG. 1 is a block diagram of an example vehicle 100 having a sensor-cleaning assembly. Vehicle 100 can include a land vehicle, such as a car, truck, a sport utility vehicle, a crossover, a van, a minivan, a taxi, a bus, etc. Vehicle 100 includes vehicle body 102, which may be of a unibody construction, in which a frame and body 102 of vehicle 100 form a single component. Alternatively, vehicle body 102 be of a body-on-frame construction, in which the frame supports vehicle body 102 that is a separate component from the frame. In accordance with body-on-frame construction of vehicle body 102, vehicle body 102 includes two components, which may include a body component and a frame component. A body component of vehicle body 102 may include a basic structure that forms the cabin, engine bay, and cargo area. The body component may be fixed to a frame, which supports the vehicle's weight and retains the suspension components of vehicle body 102.

Vehicle 100 includes sensor set 108, which can include any sensors for detecting the attributes of an environment external to vehicle 100, such as objects and/or characteristics of the surroundings of vehicle 100. Sensor set 108 can include any sensors for sensing an environment external to vehicle 100, such as cameras, radar emitters and receivers, lidar sensors, etc., which may enable an operator of vehicle 100 to view static objects (e.g., road markings, traffic lights, traffic signs, natural objects, etc.) or moving objects (e.g., pedestrians, animals, bicycles, other moving vehicles, etc.). Sensor set 108 may be arranged to view objects located at any angle in azimuth with respect to vehicle 100.

Sensor set 108 may include two front-facing sensors 108A, 108B, two side-facing sensors 108C, 108F, and two rear-facing sensors 108D, 108E. As shown in FIG. 1, front-facing sensor 108A is located at the front left corner of vehicle body 102 while front-facing sensor 108B is located at the front right corner of vehicle body 102. Sensors 108A, 108B can include fields-of-view oriented in directions forward of vehicle body 102 so as to be capable of observing static or moving objects located in a direction forward of vehicle 100. Also as shown in FIG. 1, sensor 108C is located at the right side of vehicle body 102 while sensor 108F is located at the left side of vehicle body 102. Sensors 108C and 108F can include fields-of-view oriented in directions to the right and left sides of vehicle body 102 so as to be capable of observing static or moving objects located in a direction to the sides of vehicle 100. Also as shown in FIG. 1, sensor 108D is located at the right rear corner of vehicle body 102 while sensor 108F is located at the left right corner of vehicle body 102. Sensors 108D and 108E can include fields-of-view oriented in directions to the rear of vehicle body 102 so as to be capable of observing static or moving objects located in directions to the rear of vehicle 100.

Programming of computer 104 may execute image processing programming to extract features of the environment external to vehicle 100, such as via sensors 108A-108F. Computer 104 may execute programming to fuse output signals from all sensors of sensor set 108, including sensors 108A-108F, to provide relative locations, sizes, and shapes of objects and/or conditions surrounding vehicle 100. Programming of computer 104 may implement sensor controller 104A, which may operate to detect degradation of a sensor surface by a presence of an obscurant, such as mud, dirt, dust, insects, etc., on a surface of one or more of the sensors 108A-108F. For example, if sensor 108A is a camera, sensor controller 104A may detect a region within the camera's field-of-view within which pixels are unchanging while pixels within surrounding regions appear to change as vehicle 100 proceeds along path 50. Accordingly, sensor controller 104A may determine that an obscurant is present on a lens, cover, or other surface of sensor 108A.

Computer 104 may additionally include programming to operate one or more other systems or subsystems of vehicle 100, such as brakes, propulsion (e.g., control of acceleration in the vehicle by controlling one or more of an internal combustion engine, electric motor, hybrid engine, etc.), steering, climate control, interior and/or exterior lights, etc. Computer 104 may include or be communicatively coupled to more than one processor, e.g., included in electronic controller units (ECUs) or the like of vehicle 100 for monitoring, actuating, and/or controlling various vehicle components 110, e.g., a powertrain actuator, a brake actuator, a steering actuator, etc. Components 110 can be implemented via circuits, chips, indicators (e.g., lamps, audible indicators, haptic indicators), motors (e.g., stepper motors), or other electronic and/or mechanical components that can actuate various vehicle subsystems in accordance with appropriate control signals. Computer 104 may communicate with the various sensors of sensor set 108, components 110, communications component 114, and human-machine interface (HMI) 112 utilizing vehicle communications bus 106, which can include an internal wired and/or wireless network, such as a controller area network (CAN) or the like, and/or other wired and/or wireless mechanisms. Computer 104 can include a processor and a memory, which can include one or more forms of computer-readable media and may store instructions executable by the computer for performing various operations, including those disclosed herein.

Figure 2A:
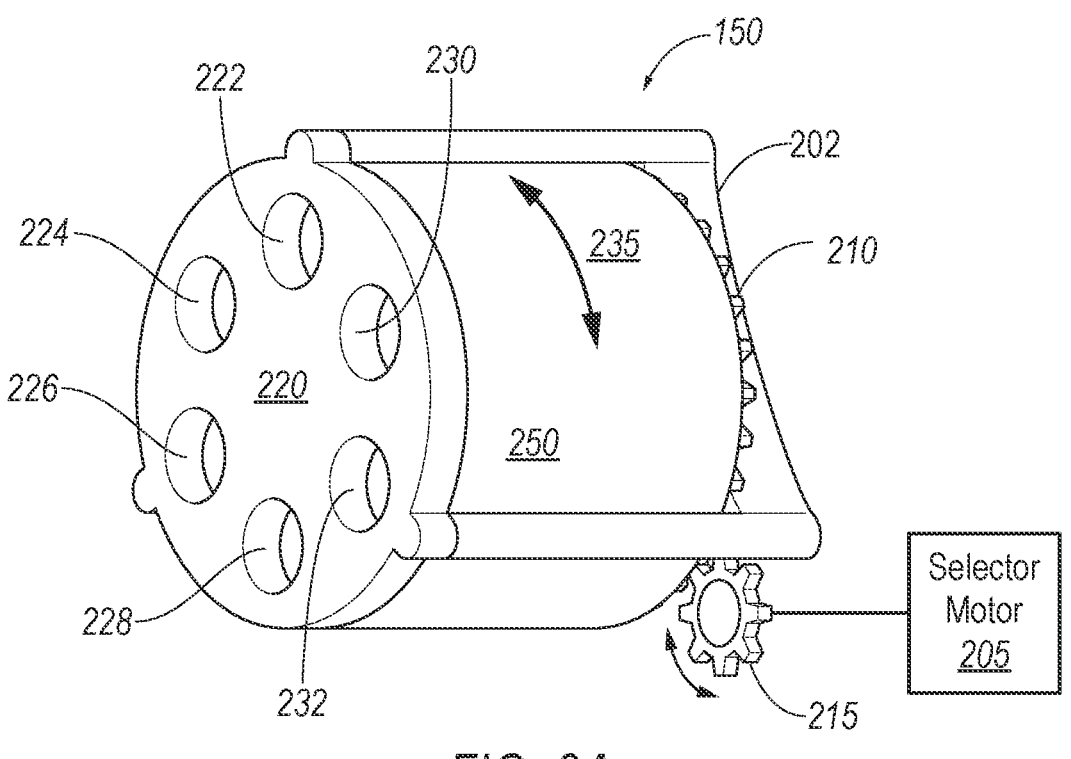
FIG. 2A is a perspective view of a first example revolving selector of a sensor-cleaning assembly.

FIG. 2A is a perspective view of first example revolving selector 150 of a sensor-cleaning assembly. As shown in FIG. 2A, revolving selector 150 includes bracket 202. Bracket 202 may be rigidly mounted to vehicle body 102. Bracket 202 may have a fixed shape. For example, bracket 202 may extend radially across the second end of cylinder-shaped revolver 250, and bracket 202 may include prongs extending axially from the second end to the first end of cylinder-shaped revolver 250.

Revolving selector 150 further includes cylinder-shaped revolver 250, which may be actuated via output signals from sensor controller 104A to rotate in a clockwise or a counterclockwise direction (as indicated by arrow 235) about cylinder axis 255. Cylinder-shaped revolver 250 may be formed from any suitable material, such as a metallic material (e.g., aluminum), plastic (e.g., synthetic polymer, acrylonitrile butadiene styrene plastic, polycarbonate, an acetal copolymer, an acetal homopolymer, etc.). Cylinder-shaped revolver 250 is rotatable relative to bracket 202, and thus is rotatable relative to vehicle body 102. For example, cylinder-shaped revolver 250 may include a fixed rod or shaft positioned along cylinder axis 255, and cylinder-shaped revolver 250 may be permitted to rotate about the fixed rod or shaft. The rod or shaft may be attached to and fixed relative to bracket 202. Cylinder-shaped revolver 250 may have a fixed position relative to bracket 202 and a fixed orientation relative to bracket 202 except for rotation about cylinder axis 255. In an example, cylinder-shaped revolver 250 may include a length and diameter of between about 35 millimeters and about 65 millimeters. This size is compact while still being sufficiently large to permit smooth fluid flow from inlet 265 to outlet 275.

As shown in FIG. 2A, faceplate 220 may abut a first end of cylinder-shaped revolver 250 and may remain stationary with respect to bracket 202. In the example of FIG. 2, faceplate 220 is sized to include a diameter that is similar to the diameter of cylinder-shaped revolver 250 (e.g., between about 35 millimeters and about 65 millimeters). The radius of faceplate 220 may be greater than a radial distance from cylinder axis 255 to a radially outermost point of outlet 275 to permit outlet 275 to be alignable with openings 222-232. Faceplate 220 may be fixed to bracket 202 utilizing a bolt, rod, or other type of fastener positioned along cylinder axis 255 or fasteners connecting to the prongs of bracket 202.

Faceplate 220 may include openings 222, 224, 226, 228, 230, and 232, which may be spaced from cylinder axis 255. Openings 222-232 can be fluidly connected to individual fluid conduits 120 described in reference to FIG. 1. Openings 222-232 may be positioned radially between the cylinder axis and the periphery of the first end of the cylinder. Further, openings 222-232 may be spaced at equal angular intervals (e.g., about) 60° with respect to cylinder axis 255. It should be noted that in other examples, openings of faceplate 220 may be spaced at other angular increments, which may accommodate differing routing constraints of fluid conduits 120 between revolving selector 150 and sensors 108A-108F.

Gear plate 210 can be abutted and fixed to a second end of cylinder-shaped revolver 250. Gear plate 210 is fixed relative to cylinder-shaped revolver 250 and rotates together with cylinder-shaped revolver 250. For example, cylinder-shaped revolver 250 and gear plate 210 may be the same piece, or gear plate 210 may be attached onto the second end of cylinder-shaped revolver 250 by adhering, welding, etc. Gear plate 210 may include a radially outer edge that includes any suitable arrangement of teeth, cogs, or any other serrations capable of engaging with a selector gear (e.g., selector gear 215), thereby actuating rotation of cylinder-shaped revolver 250 about cylinder axis 255. The teeth of gear plate 210 may be arranged in a circular pattern centered on cylinder axis 255.

In the example of FIG. 2A, sensor controller 104A may generate output signals that can be received by selector motor 205. Selector motor 205 may be mechanically coupled to gear 215, which may engage with gear plate 210 fixed to the second end of cylinder-shaped revolver 250. In response to angular movement of selector gear 215, gear plate 210 may operate to rotate cylinder-shaped revolver 250 so as to selectably align the outlet 275 of passage 270 (shown in reference to FIG. 2B) with an opening of stationary multi-opening faceplate 220. As shown in greater detail in reference to FIG. 2B, selector motor 205 may actuate selector gear 215 so as to align outlet 275 of passage 270 with any of openings 222-232. Accordingly, a fluid, such as a compressible fluid (e.g., an airflow) may be arranged to flow from inlet 265 of cylinder-shaped revolver 250 to any of openings 222-232 in any selectable order. Thus, in one example, after delivering airflow to a first opening (e.g., 222) selector gear 215 may be actuated in a clockwise or counterclockwise direction so as to align outlet 275 of passage 270 with a second opening (e.g., any of 224, 226, 228, 230, or 232) thereby arranging passage 270 to direct airflow to the second opening.

Figure 2B:
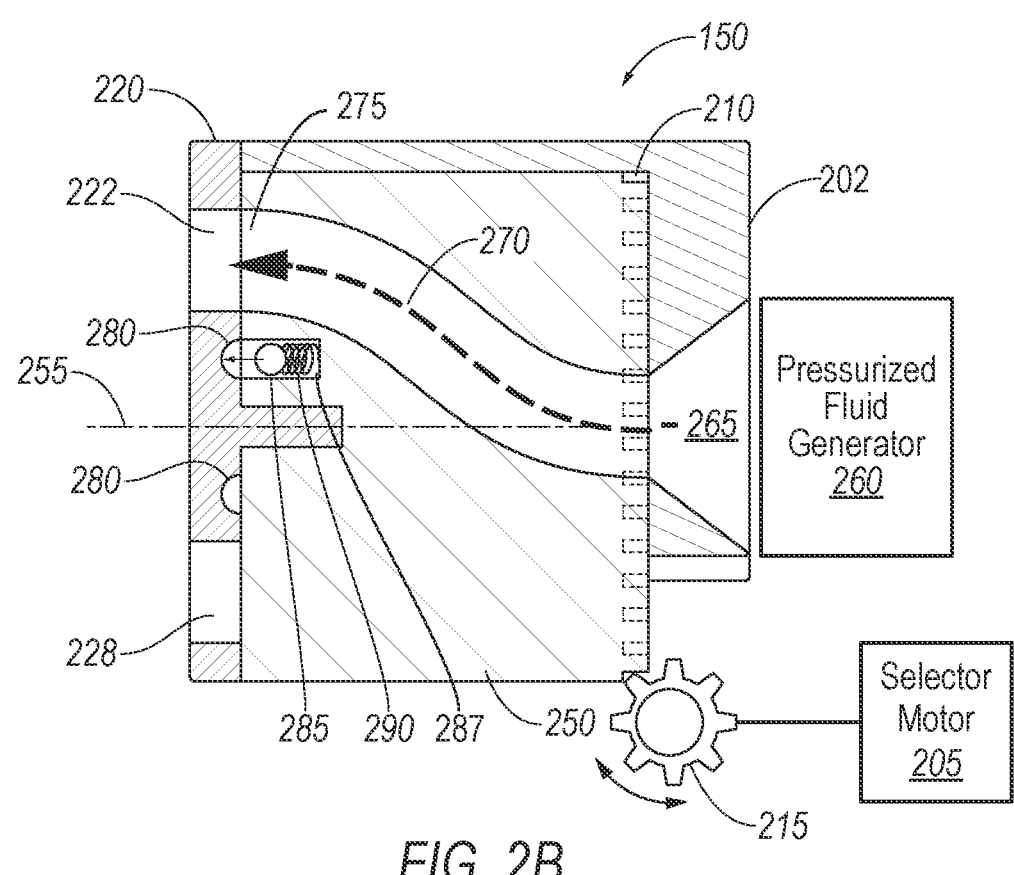
FIG. 2B is a cross-sectional side view of the first example revolving selector of a sensor-cleaning assembly.

FIG. 2B is a cross-sectional side view of the first example revolving selector 150 of a sensor-cleaning assembly. As shown in FIG. 2B, via actuation of selector motor 205, cylinder-shaped revolver 250 has been rotated to align outlet 275 of passage 270 from inlet 265 to opening 222. Passage 270 extends axially and radially outward from inlet 265 at the second end of cylinder-shaped revolver 250 to outlet 275 at the first end of cylinder-shaped revolver 250. In the example of FIG. 2B, passage 270 is shown as a conduit that smoothly curves in the radial direction, e.g., along a sigmoid curve, between inlet 265 and outlet 275, which is presently aligned with opening 222 of faceplate 220. Such smooth curvature of passage 270 may operate to reduce pressure loss, which may be introduced by sharp (e.g., right angle) bends in the passage. Passage 270 may have a constant cross-sectional area from inlet 265 to outlet 275, which may also operate to reduce pressure loss.

In the example of FIG. 2B, revolving selector 150 may include a ball-detent structure that operates to bias ball 285 (or other structure having a rounded surface) outward from cavity 287 of cylinder-shaped revolver 250 and into recess 280 of faceplate 220 (corresponding to opening 222). Cavity 287 may be located on the first end of cylinder-shaped revolver 250. The ball detent structure may thus limit movement of the cylinder with respect to faceplate 220 in response to alignment of opening 222 with the outlet of passage 270. Ball 285 may be biased to be at least partially inserted into recess 280 via a spring or other resilient element, such as spring 290. Stationary multi-opening faceplate 220 can include additional recesses, such as recess 280 corresponding to opening 228, thereby limiting movement of the cylinder with respect to faceplate 220 in response to alignment of opening 228 with the outlet of passage 270. In an example, one of recesses 280 may be proximate with each of openings 222-232. Each recess is positioned such that bias ball 285 is aligned with that recess when outlet 275 is aligned with the corresponding one of the openings 222-232.

In the example of FIG. 2B, selector motor 205 may utilize a current-sensing circuit, which operates to detect mechanical resistance, such as in the form of an increased current flow to selector motor 205 occurring in response to ball 285 engaging with recess 280. In an example, in response to detecting an increased current flow indicating engagement of ball 285 with recess 280, sensor controller 104A may actuate or energize pressurized fluid generator 260 to begin generating airflow, a flow of cleaning fluid, or the like, into inlet 265 of passage 270 to an opening (e.g., opening 222) in faceplate 220 of cylinder-shaped revolver 250.

Pressurized fluid generator 260 may comprise, for example, an air blower, a water pump, or any other source of a compressible fluid (e.g. air or other gas) or may include a pressurized source of water or other liquid. In another example, pressurized fluid generator 260 may provide a combination of a gas and a liquid, such as in the form of liquid droplets (e.g., water droplets) distributed within a gaseous medium.

As shown in FIGS. 2A and 2B, vehicle 100 may include revolving selector 150, which may be positioned beneath the hood of vehicle body 102 and attached to a frame member of the vehicle body. Revolving selector 150 may include cylinder-shaped revolver 250 (FIG. 2A), which, in an example, may operate to fluidly connect an output of pressurized fluid generator 260 (FIG. 2A) to provide forced airflow cleaning of a surface of sensors 108A-108F via fluid conduits 120. Accordingly, in a first selectable position, revolving selector 150 may operate to provide forced airflow cleaning of sensor 108A positioned at the front left corner of vehicle body 102. In a second selectable position, revolving selector 150 may operate to provide forced airflow cleaning of sensor 108B positioned at the front right of vehicle body 102. In a third selectable position, revolving selector 150 may operate to provide forced airflow cleaning of right side-facing sensor 108C. In a fourth selectable position, revolving selector 150 may operate to provide forced airflow cleaning of left side-facing sensor 108F. In a fifth selectable position, revolving selector 150 may operate to provide forced airflow cleaning of right rear-facing sensor 108D. In a sixth selectable position, revolving selector 150 may operate to provide forced airflow cleaning of left rear-facing sensor 108E. In an example, each of sensors 108-108F can be positioned proximate to a respective nozzle 109, which provides the forced airflow to the respective surface of the sensors 108A-108F.

FIG. 3 is a cross-sectional side view of second example cylinder-shaped revolver (350) of a sensor-cleaning assembly 300. In the example of FIG. 3, cylinder-shaped revolver 350 may include bracket 202 and faceplate 220 as described above. As seen in FIG. 3, cylinder-shaped revolver 350 may include a plurality of passages, e.g., passages 370 and 375, which may operate to form fluid flow passages between pressurized fluid generator 260 and openings 222 (e.g., proximate to outlet 376) and 228 (e.g., proximate to outlet 377). Passages 370, 375 may share the same inlet (265) and branch apart to different respective outlets 376, 377. The example of FIG. 3 shows an arrangement that permits pressurized fluid generator 260 to convey airflow from pressurized fluid generator 260 to two openings of stationary multi-opening faceplate 220. Outlets 376 and 377 may be arranged so as to both be aligned with different ones of the openings of faceplate 220 simultaneously. In an example, via passages 370 and 375, airflow or another fluid can be coupled from a pressurized generator (e.g., 260) to, for example, both front-facing sensors 108A, 108B, both side-facing sensors 108C, 108F, or both rear-facing sensors 108D, 108E. Such an arrangement may permit zone-based cleaning of sensor surfaces, such as simultaneous cleaning of sensors located in a front zone of vehicle body 102 (e.g., sensors 108A, 108B), at the sides of vehicle body 102 (e.g., sensors 108C, 108F), or at the rear of vehicle body 102 (e.g., sensors 108D, 108E). Similar to that of cylinder-shaped revolver 250, cylinder-shaped revolver 350 includes gear plate 210 arranged to engage with selector gear 215 of FIGS. 2A and 2B to rotate cylinder-shaped revolver 350 about cylinder axis 355. Although not shown explicitly in FIG. 3, sensor-cleaning assembly 300 may include a ball-detent structure similar to that shown in FIG. 2B.

FIG. 4 is a flowchart for a process (400) of operating a sensor-cleaning assembly. A sensor-cleaning assembly may operate in response to detection of an obscurant on a surface of a sensor, such as at block 405 of process 400. Alternatively or in addition, sensor surface cleaning may be performed intermittently so as to preclude sensor surfaces from accumulating dust, dirt, etc. In an example, in response to detection of the obscurant on a surface of, for example, sensor 108A, sensor controller 104A can initiate a cleaning process to remove the obscurant from the surface of sensor 108A. In an example, as previously described herein, sensor controller 104A can generate an output signal to align the outlet of passage 270 with a first opening (e.g., opening 222) of stationary multi-opening faceplate 220 that abuts the first side of cylinder-shaped revolver 250. Alignment of the outlet of passage 270 with the first opening (e.g., 222) may enable a fluid to flow from inlet 265 of cylinder-shaped revolver 250 to opening 222 of the stationary multi-opening faceplate. In an example, in response to the alignment of outlet 275 of passage 270 and first opening 222, sensor controller 104A can actuate pressurized fluid generator 260, which may generate a pressurized fluid such as an airflow, a flow of sensor-cleaning fluid, etc. Thus, in such an example, the pressurized fluid (e.g., airflow) can be coupled from pressurized fluid generator 260, through the passage (e.g., 270) between inlet 265 and the first opening (e.g., 222), and through a conduit that fluidly couples the first opening to a nozzle (e.g., 120), for example, or to another type of duct aimed at the surface of sensor 108A.

Process 400 may continue at block 410, which may include selector motor 205 rotating a cylinder about axis 255 defined by a cylinder so as to form passage 270 between inlet 265 centered on axis 255, and an opening (e.g., 222) of stationary multi-opening faceplate 220 abutted to cylinder-shaped revolver 250. Alignment of passage 270 with inlet 265 can operate to establish a fluid path between the inlet and the opening in the multi-opening faceplate.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above and is accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor-cleaning assembly, comprising:
a stationary faceplate having multiple openings; and a cylinder defining an axis and abutting the faceplate at a first end of the cylinder, the cylinder being rotatable about the axis relative to the faceplate, the cylinder including a passage from an inlet centered on the axis to an outlet that is alignable with a first opening of the multiple openings of the faceplate responsive to rotation of the cylinder;
wherein the passage includes a fluid conduit that smoothly curves in a radial direction from the inlet at the axis moving radially outward from the axis to the outlet radially offset from the axis.

2. The sensor-cleaning assembly of claim 1, wherein the outlet is alignable with a second opening of the multiple openings responsive to rotation of the cylinder.

3. The sensor-cleaning assembly of claim 1, wherein the multiple openings are distributed at equal angular intervals with respect to the axis.

4. The sensor-cleaning assembly of claim 1, further comprising a detent positioned to limit movement of the cylinder with respect to the faceplate in response to alignment of the first opening with the outlet.

5. The sensor-cleaning assembly of claim 4, wherein the detent includes a rounded surface coupled to a spring biased to extend the rounded surface from a cavity of the cylinder.

6. The sensor-cleaning assembly of claim 4, wherein the detent includes a rounded surface coupled to a spring to position the rounded surface within a recess of the faceplate responsive to alignment of the first opening with the passage.

7. The sensor-cleaning assembly of claim 1, wherein the first opening is fluidly coupled to a nozzle aimed at a sensor cleanable by the sensor-cleaning assembly.

8. The sensor-cleaning assembly of claim 1, wherein the inlet is fluidly coupled to a pressurized fluid generator.

9. The sensor-cleaning assembly of claim 8, wherein the pressurized fluid generator is a pressurized airflow generator.

10. The sensor-cleaning assembly of claim 1, wherein the multiple openings are spaced from the cylinder axis, and the multiple openings are positioned radially between the cylinder axis and the periphery of the first end of the cylinder.

11. The sensor-cleaning assembly of claim 1, wherein the cylinder includes a gear plate at a second end of the cylinder, the gear plate arranged to rotate the cylinder responsive to actuation of a selector motor.

12. The sensor-cleaning assembly of claim 11, wherein the selector motor is arranged to selectably rotate the cylinder between clockwise and counterclockwise directions.

13. The sensor-cleaning assembly of claim 1, wherein the cylinder includes a second passage from the inlet to a second outlet that is alignable with a second opening of the multiple openings responsive to rotation of the cylinder.

14. The sensor-cleaning assembly of claim 13, wherein the second opening is positioned at a location that is across from the first opening with respect to the cylinder axis.

15. The sensor-cleaning assembly of claim 13, wherein the second outlet is alignable with the second opening simultaneous with the outlet being aligned with the first opening.

16. The sensor-cleaning assembly of claim 1, wherein the assembly additionally includes a controller programmed to:
detect an obscurant at a surface of a sensor cleanable by the sensor-cleaning assembly; and
in response to detection of the obscurant, position the cylinder to align the outlet with the first opening, the first opening being fluidly coupled to an outlet air duct aimed at the sensor.

17. The sensor-cleaning assembly of claim 16, wherein the controller is additionally programmed to:

sense an increase in electrical current conducted to a stepper motor coupled to the cylinder in response to spring-biased rounded surface of the cylinder contacting a recess in the faceplate.

18. A method of operating a sensor-cleaning assembly, comprising:

detecting an obscurant on a surface of the sensor; and rotating a cylinder about an axis defined by the cylinder to form a passage between an inlet centered on the axis and an opening of a stationary faceplate having multiple openings and abutted to the cylinder at a first end of the cylinder, the opening being fluidly coupled to the sensor, the passage from the inlet to an outlet of the passage being alignable with a first opening of the multiple openings of the faceplate responsive to rotation of the cylinder;

wherein the passage includes a fluid conduit that smoothly curves in a radial direction from the inlet at the axis moving radially outward from the axis to the outlet radially offset from the axis.

19. The method of claim 18, wherein rotating the cylinder comprises actuating a motor coupled to a gear that abuts the cylinder at a second cylinder end that is opposite the first end.

\* \* \* \* \*